United States Patent [19]

Stanley et al.

[11] Patent Number: 4,457,897

[45] Date of Patent: Jul. 3, 1984

[54] PROCESS FOR THE SELECTIVE DISSOLUTION OF COBALT FROM COBALTITE-PYRITE CONCENTRATES

[75] Inventors: Robert W. Stanley, Kirkland; Serge Monette, Longueuil; Bryn Harris, Kirkland, all of Canada

[73] Assignee: Noranda Mines Limited, Toronto, Canada

[21] Appl. No.: 425,638

[22] Filed: Sep. 28, 1982

[51] Int. Cl.³ ............................................. C01G 51/00
[52] U.S. Cl. .................................... 423/141; 423/146; 423/150; 423/558; 423/87
[58] Field of Search ............... 423/141, 145, 146, 150, 423/87, 558

[56] References Cited

U.S. PATENT DOCUMENTS

| 2,296,423 | 9/1942 | Clark | 423/141 |
| 2,686,114 | 8/1954 | McGauley | 423/141 |
| 2,898,197 | 8/1959 | Forward | 423/146 |

FOREIGN PATENT DOCUMENTS 760624 11/1956 United Kingdom ................ 423/146

OTHER PUBLICATIONS

"Le cobalt en France", by E. M. Elchardus and J. F. Reynaud, *Chimie Et Industrie*, vol. 86 (5) 1961, pp. 531-541.
"Leach Licks Arsenic Bugaboo in Metal Ore", C. H. Chilton *Chemical Engineering*, Jan. 13, 1958 (vol. 65 (1), pp. 80-82.
"Pressure Leaching and Reduction at the Garfield Refinery", J. S. Mitchell, *Mining Engineering*, Nov. 1956 (vol. 8) pp. 1093-1095.
"The Generation of Sulphuric Acid from Pyrite by Pressure Leaching", by I. H. Warren, *Australian Journal of Applied Science*, vol. 7, 1956, pp. 346-358.

*Primary Examiner*—John Doll
*Assistant Examiner*—Robert L. Stoll
*Attorney, Agent, or Firm*—Fleit, Jacobson, Cohn & Price

[57] ABSTRACT

A hydrometallurgical process for the recovery of cobalt from cobaltite-pyrite concentrates containing substantial amounts of cobalt, arsenic, iron and sulphur is disclosed. The hydrometallurgical process comprises pressure leaching of the cobaltite-pyrite concentrates with a sodium chloride or sodium sulphate solution at a temperature in the range of 130°-160° C. and under oxygen partial pressures in the range of 75-200 psi to solubilize at least 90% of the cobalt content, while simultaneously precipitating most of the iron and arsenic as jarosite and ferric arsenate.

12 Claims, 6 Drawing Figures

PROCESS FOR THE SELECTIVE DISSOLUTION OF COBALT FROM COBALTITE-PYRITE CONCENTRATES

This invention relates to a hydrometallurgical process for selective dissolution of cobalt from cobaltite-pyrite concentrates.

Most of the world's cobalt production is derived as a by-product of copper or nickel operations. The treatment of primary cobalt ores for cobalt recovery has generally been limited due to the fact that, (i) until recently, cobalt prices have been relatively low, and (ii) many of the primary ores are arsenical. The principal cobalt arsenides that have been mined and processed for cobalt recovery are smaltite ($CoAs_2$), skutterudite ($CoAs_3$) and the cobalt sulfo-arsenide, cobaltite ($CoAsS$).

Smaltite concentrates have been treated by combined pyrometallurgical and hydrometallurgical processes. However, these processes required that the concentrates be first roasted or smelted to eliminate most of the arsenic in the feed. Current regulations concerning arsenic emissions and the workroom environment make such techniques unattractive.

The direct hydromettalurgical treatment of smaltite concentrates with sulphuric acid-nitric acid solution (Nobel-Bozel Process) was conducted briefly on a commercial basis in France as disclosed by Elchardus, E. M. and Reynaud, J. F., Chimie et Industrie, 86 (5), 531–541 (1961). However, the process was complicated, involving the use of nitrates, sulphates and chlorides, and was eventually shut down. Furthermore, the Nobel-Bozel process only treated low sulphur ($\sim 1.7\%$) concentrates.

Treatment of cobaltite and/or smaltite concentrates by the so-called Sill process, as disclosed by Chilton, C. H., Chemical Engineering, 65 (1), 80–82 (1958), was investigated at the pilot plant scale, but apparently not commercialized. The process involved removal of arsenic from the concentrates by a caustic pressure leach, and conventional processing of the arsenic-free leach residue to cobalt and nickel oxides. The caustic leach solution containing sodium arsenate and sodium sulphate was treated by (i) neutralization with lime to produce calcium arsenate and regenerate sodium hydroxide and (ii) crystallization to eliminate sodium sulphate. This process resulted in the elimination of arsenic as calcium arsenate, an unattractive product for disposal.

The Calera Process (developed by Calera Mining Company) operated on the treatment of high grade cobaltitepyrite concentrates (16–18% Co) from 1953–1959, as disclosed by Mitchell, J. S., Mining Engineering, 8, 1093–1095, (1956). The process was based on dissolving cobalt, nickel and copper sulphates in a high temperature pressure leach (200° C., 600 psi steam and air). The sulphides and arsenosulphides were totally oxidized to sulphates, with the production of a considerable excess of sulphuric acid. Arsenic and iron in the feed were rejected to the leach residue, as ferric arsenate, by charging lime to the auto-clave, so as to neutralize much of the free acid, and blending the concentrate feed so as to maintain an As/Fe weight ratio of 1.2. The process experienced severe operating difficulties and operations ceased in 1959.

Application of the Calera process to the treatment of low grade cobaltite/pyrite concentrates typically 5–7% Co, 0.1–0.4% Ni, 0.3–0.7% Cu, 9–13% As, 26–35% Fe and 28–39% S, of interest to the present applicant, is not attractive. The process conditions required are severe and the total oxidation of concentrate achieved in the Calera process would result in excessive acid formation and the dissolution of much of the iron.

The applicant surprisingly has found, in accordance with the present invention, that high extractions of cobalt can be achieved, with minimum dissolution of iron and arsenic, by leaching with sodium sulphate or sodium chloride solution at temperatures in the range of 130°–160° C., preferably 140°–150° C. and oxygen partial pressures in the range of 75–200 psi, preferably 75–175 psi. Under these conditions, only a portion of the iron sulphides are attacked, thereby minimizing sulphuric acid formation, and much of the iron and arsenic dissolved by leaching of the concentrate is precipitated in-situ as sodium jarosite and ferric arsenate.

The sodium sulphate or sodium chloride solution is preferably 25–30% solids. Pressure leaching is preferably carried out with a sodium sulphate solution in the range of 20–75 g/L.

Operation at oxygen partial pressures of less than 175 psi showed the presence of an induction period, the duration of which increased with decreasing oxygen pressure. However, this induction period can be overcome by the addition of sulphuric acid, and/or ferric iron to the leachant.

The hydrometallurgical process, in accordance with the present invention, comprises the following steps:

(a) Pressure leaching the concentrate in an autoclave with a sodium chloride or sodium sulphate solution at temperatures in the range of 130°–160° C., preferably 140°–150° C. and under oxygen partial pressures in the range of 75–200 psi, preferably 75–175 psi., to solubilize at least 90% of the cobalt content, while simultaneously precipitating most of the iron and arsenic as jarosite and ferric arsenate;

(b) Discharging the leach slurry from the autoclave and neutralizing the slurry to pH 1.0–1.5 at 85°–95° C. at atmospheric pressure with lime, limestone or other neutralizing agents, so as to complete iron and arsenic precipitation as jarosite and ferric arsenate;

(c) Conducting a liquid-solid separation with the slurry from the atmospheric jarosite precipitation step to obtain a primary filtrate for further processing for cobalt recovery;

(d) Washing the jarosite-ferric arsenate residue to eliminate entrained metal values and recirculating the residue wash solution to the autoclave to form a 25–40%, preferably 25–30% solids slurry with concentrate. Sodium chloride or sodium sulphate addition is made to the recycle wash-concentrate slurry.

The invention will now be disclosed, by way of example, with reference to the accompanying drawings in which.

Laboratory pressure leach tests carried out on various samples of the same concentrate analysing 5.27% Co, 0.09% Ni, 0.29% Cu, 33.1% Fe, 10.3% As, 37.3% S using water, NaCl and $Na_2SO_4$ as leachants have been performed as illustrated in the following examples:

EXAMPLE I

A 365 g sample of the above concentrate was leached with 0.85 L water at 150° C. and 175 psi oxygen for 1 hour in a 2-L Parr autoclave. At the end of the leach, the slurry was filtered by vacuum and the solids were washed with water. The leach solution (24 g/L Co, 0.4 g/L Ni, 0.8 g/L Cu, 57 g/L Fe, 11 g/L As, 60 g/L $H_2SO_4$) contained 90% of the cobalt, 94% of the nickel, 61% of the copper, 45% of the iron and 27% of the arsenic in the concentrate sample. The weight of the leach residue was 68% that of the feed.

Analysis of the leach products showed that 16% of the feed sulphur was converted to S° and 35% reported to the leach residue as unreacted sulphide. The balance was oxidized to sulphate.

EXAMPLE II

A 365 g portion of the same concentrate employed in Example I was leached with 0.85 L of 38 g/L NaCl solution at 150° C. and 175 psi oxygen for 1.0 h in a 2-L Parr autoclave. The leach solution (24 g/L Co, 0.4 g/L Ni, 1.1 g/L Cu, 19 g/L Fe, 0.3 g/L As, 51 g/L $H_2SO_4$) obtained after liquid/solid separation contained 98% of the cobalt, 94% of the nickel, 88% of the copper, 14% of the iron and 2% of the arsenic in the concentrate sample. The weight of the leach residue was 103% that of the concentrate feed.

Analysis of the leach products showed that 22% of the feed sulphur was converted to S° and 31% reported to the leach residue as unreacted sulphide. The balance was oxidized to sulphate.

EXAMPLE III

A 365 g portion of the concentrate employed in Example I was leached with 0.85 L of 46 g/L $Na_2SO_4$ solution at 150° C. and 175 psi oxygen for 1 h in a 2-L Parr autoclave. The leach solution (21 g/L Co, 0.4 g/L Ni, 0.7 g/L Cu, 33 g/L Fe, 5 g/L As, 98 g/L $H_2SO_4$) contained 98% of the cobalt, 90% of the nickel, 58% of the copper, 24% of the iron and 14% of the arsenic in the concentrate feed. The weight of the leach residue was 91% of the feed weight.

The results of these tests indicate that the addition of sodium ions (NaCl or $Na_2SO_4$) substantially improves the iron and arsenic rejection to the leach residue. The use of NaCl, as opposed to $Na_2SO_4$, increases corrosion risk and chloride resistant material would be required at all points in the flowsheet. Therefore $Na_2SO_4$ is the preferred leachant.

The effect of variations in temperature (130°-160° C.), percent solids (30-40%) and sodium sulphate concentration was carried out in a series of pressure leach tests with a concentrate sample assaying 5.3% Co, 0.09% Ni, 0.29% Cu, 10.3% As, 33.1% Fe and 37.3% S.

Figure 1:
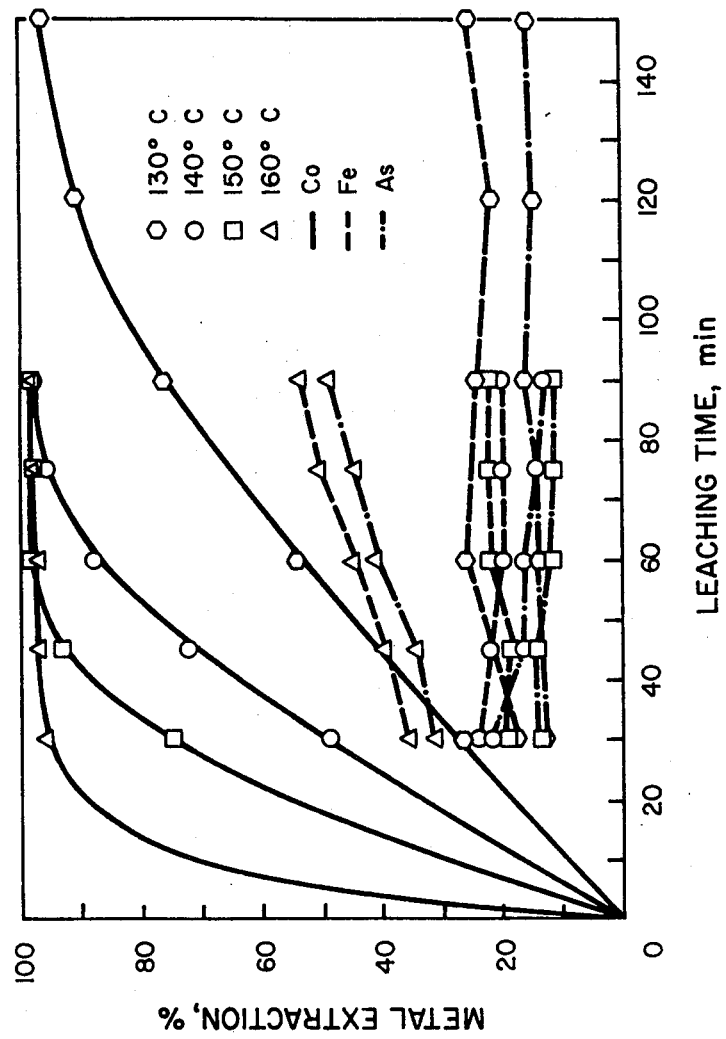
FIG. 1 illustrates the effect of temperature in the range of 130°–160° C. on the rate of cobalt, iron and arsenic dissolution at 175 psi oxygen and 30% solids in 46 g/L sodium sulphate solution.

This study showed that increasing temperature in the range of 130°-160° C. resulted in greatly increased rates of cobalt extraction, as shown in FIG. 1. Nickel extractions were virtually identical to those of cobalt in both rate and degree. The degree of iron and arsenic dissolution was virtually independent of temperature in the range of 130°-150° C., but increased substantially at 160° C. due to the increased oxidation of sulphide sulphur in the concentrate to sulphate sulphur as shown in the following Table I, with the attendant increase in sulphuric acid formation.

TABLE I

| | FINAL SULPHUR DISTRIBUTION, % | | |
|---|---|---|---|
| | S° | S= | $SO_4^=$ |
| 130° | 15 | 40 | 45 |
| 140° | 16 | 31 | 53 |
| 150° | 16 | 29 | 55 |
| 160° | 8 | 18 | 74 |

Increasing the percent solids from 30 to 40% at a constant $Na_2SO_4$/concentrate weight ratio had little effect on the pressure leach metallurgy, but operation at 40% solids resulted in the production of viscous slurries during subsequent neutralisation of the pressure leach slurries.

Figure 2:
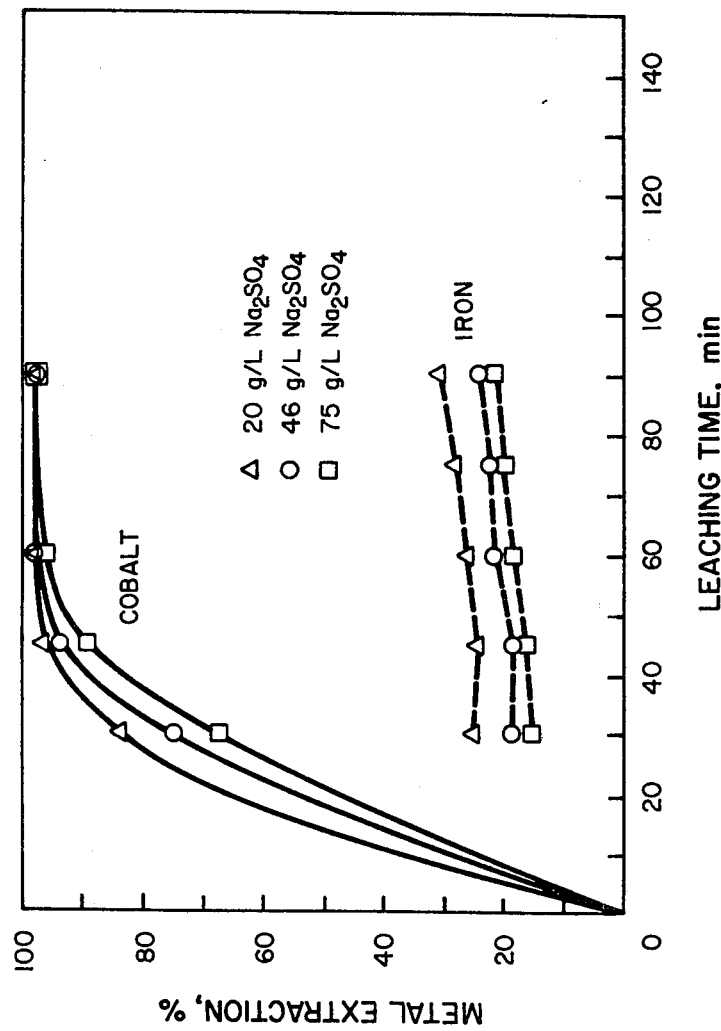
FIG. 2 illustrates the effect of sodium sulphate concentration in the range of 20–75 g/L on the rate of cobalt and iron dissolution at 150° C., 175 psi oxygen and 30% solids.

Increasing sodium sulphate concentration, within the range of 20-75 g/L, resulted in reduced initial rates of cobalt dissolution but had no effect on the time required to achieve greater than 97% cobalt extraction as shown in FIG. 2. The degree of iron and arsenic (not shown) rejection increased slightly with increasing sodium sulphate concentration.

Further tests were carried out to show the effects of oxygen partial pressure and sulphuric acid and ferric iron addition as illustrated in the following examples:

EXAMPLE IV

A 10 kg sample of concentrate (5.77% Co, 0.13% Ni, 0.36% Cu, 9.94% As, 31.6% Fe) was leached with 20 g/L $Na_2SO_4$ solution at 150° C., 30% solids and 175 psi oxygen in a fully baffled 10-US gallon titanium autoclave for 2 hours. The leach solution (28.1 g/L Co, 0.6 g/L Ni, 0.9 g/L Cu, 4.3 g/L As, 35.4 g/L Fe) obtained after solid/liquid separation contained 98% of the cobalt, 95% of the nickel, 59% of the copper, 9% of the arsenic and 28% of the iron in the concentrate sample. Analysis of the leach products showed 9% of the feed sulphur was oxidized to S° and 56% was oxidized to sulphate. The balance was unreacted sulphide.

EXAMPLE V

The leach described in Example IV was repeated, but at 125 psi oxygen. After 3.5 hours, extractions of 99% of the cobalt and nickel, 80% of the copper, 13% of the arsenic and 32% of the iron in the concentrate were obtained. During this time, 60% of the concentrate feed sulphur was oxidized to sulphate and 10% to S°. The balance remained in the leach residue as unreacted sulphide.

EXAMPLE VI

The leach described in Example V was repeated, but with the addition of 50 g/L $H_2SO_4$ to the sodium sulphate solution. After 2 hours, 98% of the cobalt, 95% of the nickel, 61% of the copper, 18% of the arsenic, and 34% of the iron in the concentrate sample had been extracted to the leach solution. Product sulphur distribution between sulphate, sulphide and elemental sulphur was identical to that in Example V.

EXAMPLE VII

The leach described in Example V was repeated, but with additions of 50 g/L $H_2SO_4$ + 25 g/L ferric iron (as ferric sulphate) to the 20 g/L $Na_2SO_4$ solution. In 75 minutes, 98% of the cobalt, 96% of the nickel, 56% of the copper, 28% of the arsenic and 32% of the iron in the concentrate sample had been extracted to the leach solution. Approximately 10% of the feed sulphur was oxidized to S° and 45% to sulphate. The balance was unreacted sulphide.

Figure 3:
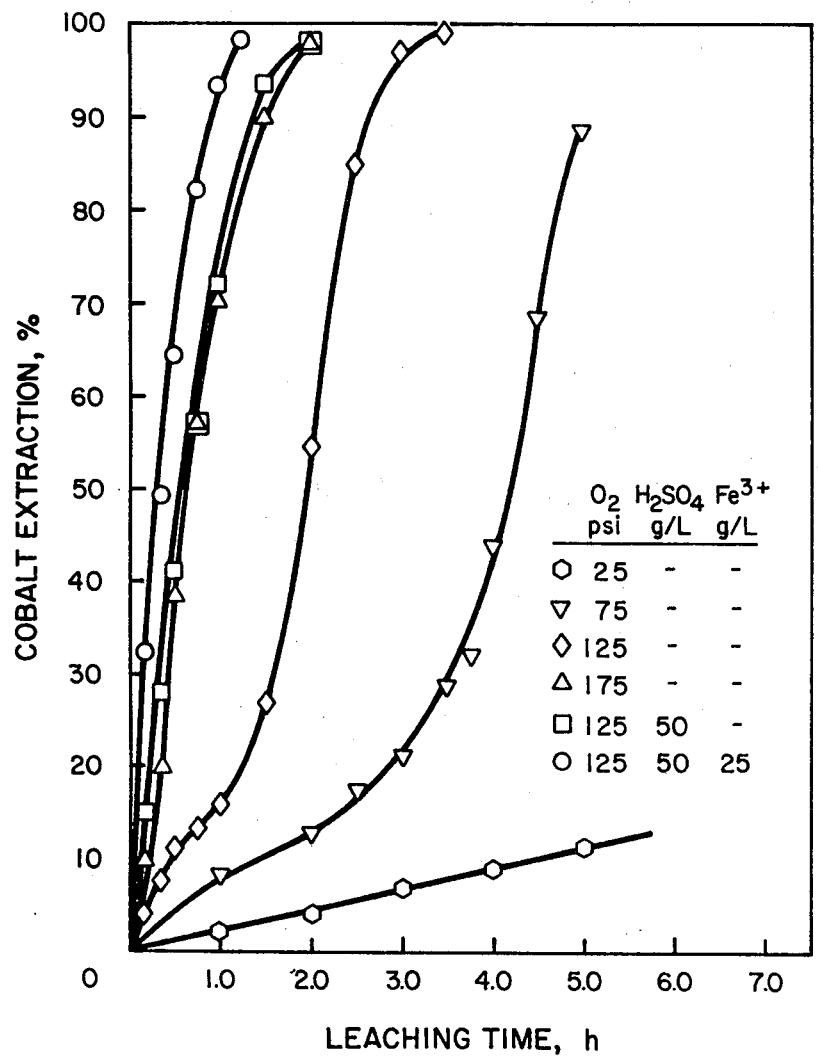
FIG. 3 illustrates the rate of cobalt extraction from a concentrate with 20 g/L sodium sulphate solution at 150° C. and 30% solids as a function of oxygen pressure in the range of 25–175 psi and initial ferric iron and sulphuric acid concentration, showing the presence of the induction period at lower oxygen pressure.

This study showed the presence of an induction period, the duration of which increased with decreasing oxygen pressure, when operating at oxygen partial pressures less than 175 psi. However, once the induction period was overcome (corresponding to approximately 30% Co extraction), the rate of leaching was almost independent of the applied oxygen pressure as shown in FIG. 3.

Analysis of slurry thief samples taken during the tests indicated that the first stage reaction (induction period) corresponded to the partial oxidation of pyrite to form ferric iron and sulphuric acid and that the second stage reaction, which was independent of oxygen pressure, was due to the leaching of cobaltite by ferric sulphate. The induction period may be eliminated by addition of sulphuric acid and/or ferric iron to the sodium sulphate leachant.

These results are consistent with reports (Warren, I. H. Australian J. Applied Science 7, 1956, p. 346) that: (i) the rate of pyrite oxidation is proportional to the square root of the oxygen pressure, and (ii) the presence of sulphuric acid prevents the formation of an iron oxide film on the pyrite surface.

In a continuous operation, acid and ferric iron would naturally be present in the autoclave slurry, so that the induction period should not be apparent.

At a cobalt extraction of 98%, 60-70% of the sulphide sulphur was oxidized, 8-10% to elemental sulphur, and the rest to sulphate. The addition of sulphuric acid and ferric iron did not result in any significant change in sulphur oxidation.

Figure 4:
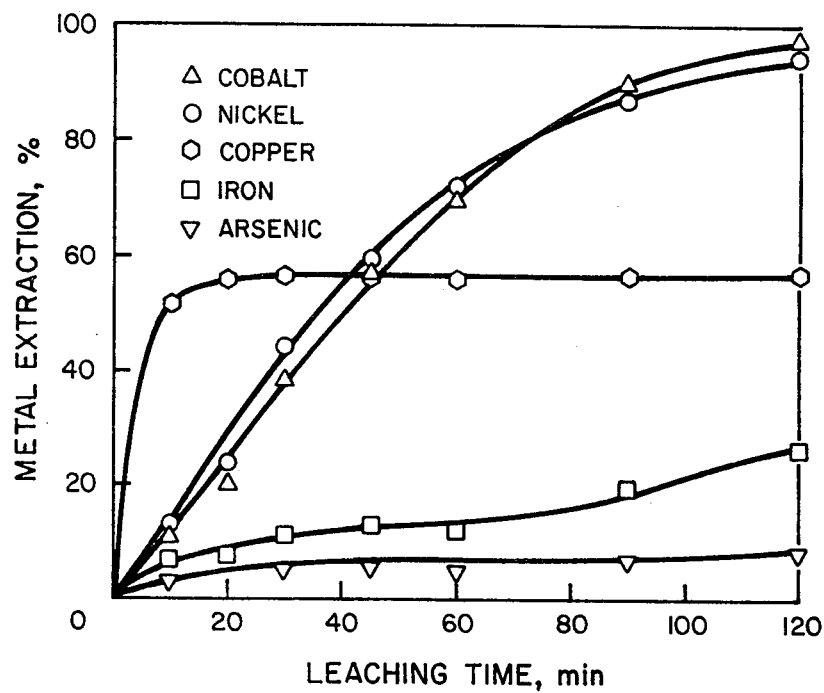
FIGS. 4 and 5 illustrate the rates of metal extraction and sulphur oxidation, respectively, in leaching of cobalt concentrate at 150° C., 175 psi oxygen and 30% solids.
Figure 5:
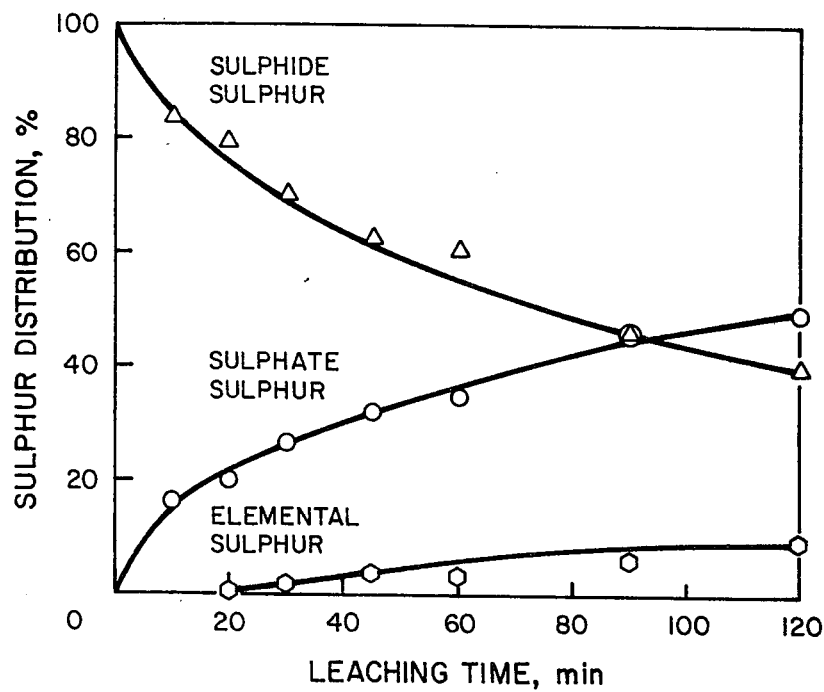

The preferred conditions for treatment of the above concentrate, based on batch tests, are:
Temperature—150° C.
Oxygen pressure—175 psi
% solids—30
Leachant $Na_2SO_4$—30 g/L
Cobalt extractions of >97% were obtained within 2.0 h with minimum dissolution of iron and arsenic, and acceptable levels of sulphide sulphur oxidation as shown in FIGS. 4 and 5 of the drawings.

Figure 6:
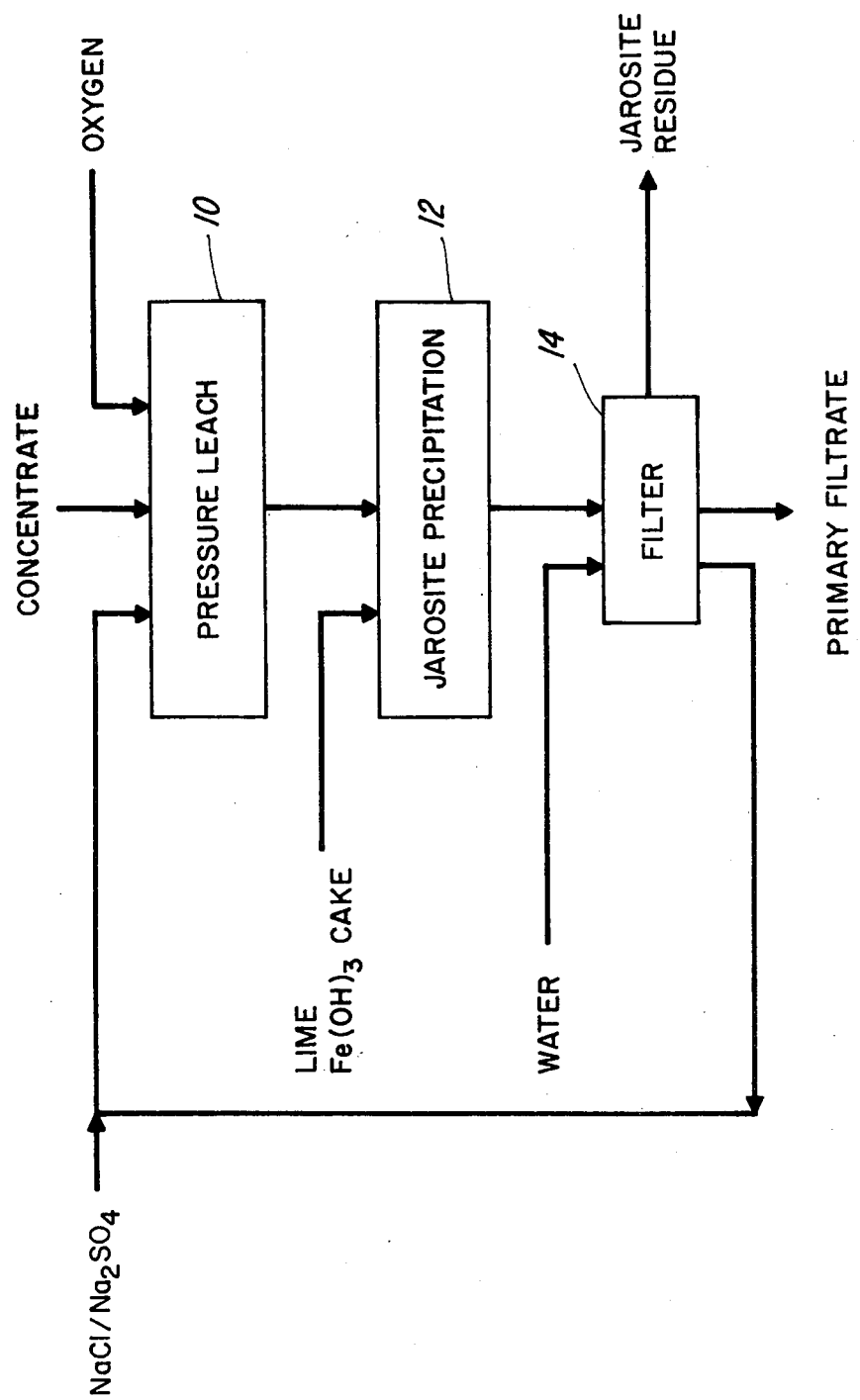
FIG. 6 is a flowsheet of a cyclic pressure leach incorporating jarosite precipitation and washing.

Referring to FIG. 6 of the drawings, there is shown a flowsheet of a cyclic pressure leach for the extraction of cobalt from a cobaltite-pyrite concentrate. Each cycle, a sample of concentrate is leached in an autoclave 10 with a recycled jarosite wash solution adjusted to 20-75 g/L NaCl or $Na_2SO_4$ at 25-30% solids. The solution is maintained at 130°-160° C. under 75-200 psi oxygen partial pressure to solubilize at least 90% of the cobalt content, while simultaneously precipitating most of the iron and arsenic as jarosite and ferric arsenate.

The leach solution is discharged from the autoclave into a jarosite precipitation stage 12 and neutralized to pH 1.0-1.5 at 85°-95° C. and atmospheric pressure, with lime, limestone or other neutralizing agents, so as to complete iron and arsenic precipitation as jarosite and ferric arsenate.

Liquid-solid separation is conducted with the slurry from the atmospheric jarosite precipitation stage 12 in a filter 14 so as to obtain a primary filtrate which is further processed by conventional methods for cobalt recovery.

The jarosite-ferric arsenate residue is washed with water to eliminate entrained metal values and sulphuric acid and the residue wash solution is recirculated to the pressure leach autoclave so as to recover the metal values contained therein.

Cyclic pressure leaches were carried out according to the flowsheet disclosed above under the specific operating conditions mentioned in the following example:

EXAMPLE VIII

The leach described in Example IV was tested on a cyclic basis following the flowhsheet shown in FIG. 6. Each cycle, a 10 kg sample of concentrate (6.11% Co, 0.15% Ni, 0.38% Cu, 9.3% As, was leached with recycled jarosite wash (3-9 g/L Co, 0.1-0.2 g/L Ni, 0.1-0.2 g/L Cu, 0.5-4.0 g/L Fe, 0.04-0.1 g/L As, 1-3 g/L $H_2SO_4$), adjusted to 20-30 g/L $Na_2SO_4$, at 30% solids, 150° C. and 175 psi oxygen for 2 hours in a fully-baffled 10-US gallon titanium autoclave. Average Co and Ni extractions of 97.6% and 95.6% were achieved over 55 cycles.

The pressure leach slurry was neutralized with 20% lime slurry and a ferric hydroxide/gypsum cake (recycled from subsequent purification stages in the hydrometallurgical flowsheet for cobalt metal recovery) at 85°-95° C., pH 1.5 until the ferric iron concentration dropped to <1 g/L (120-160 minutes). Average recoveries of Co and Ni from fresh concentrate to jarosite filtrate were 96.4% and 91.4% respectively. Arsenic and iron rejections to the jarosite residue were 97.9% and 98.9% respectively. Jarosite residues, 180 wt % of the concentrate, analyzed 0.1-0.4% Co, 0.01-0.02% Ni, 17-20% Fe, 4-6% As, 2-3% S°, 8-10% $S^{2-}$ and 29-33% $SO_4^{2-}$.

We claim:

1. A hydrometallurgical process for the recovery of cobalt from cobaltite-pyrite concentrates containing substantial amounts of cobalt, arsenic, iron and sulphur, with an excess of iron relative to arsenic of at least two to one, comprising pressure leaching of the concentrates with a sodium chloride or sodium sulphate solution at temperatures of 130°-160° C. and under oxygen partial pressures of 75-200 psi to solubilize most of the cobalt content, while simultaneously limiting the oxidation of pyrite and precipitating most of the solubilized iron and arsenic as jarosite and ferric arsenate.

2. A hydrometallurgical process as defined in claim 1, wherein the leaching temperature is about 150° C.

3. A hydrometallurgical process as defined in claim 1, wherein the oxygen partial pressure is about 175 psi.

4. A hydrometallurgical process as defined in claim 1, 2 or 3 wherein the sodium chloride or sodium sulphate slurry is 25-40% solids.

5. A hydrometallurgical process as defined in claim 1, 2 or 3, wherein pressure leaching is conducted in a sodium sulphate solution within the range of 20-75 g/L.

6. A hydrometallurgical process as defined in claim 1 or 2, wherein sulphuric acid and/or ferric iron is added at low oxygen partial pressure to overcome an initial induction period.

7. A hydrometallurgical process as defined in claim 1, wherein the cobaltite-pyrite concentrate contains about 5–7% Co, 0.1–0.4% Ni, 0.3–0.7% Cu, 9–13% As, 26–35% Fe and 28–39% S.

8. A hydrometallurgical process for the recovery of cobalt from cobaltite-pyrite concentrates, with an excess of iron relative to arsenic of at least two to one, containing substantial amounts of cobalt, arsenic, iron and sulphur, comprising the steps of:
 (1) pressure leaching the concentrate in an autoclave with a sodium chloride or sodium sulphate solution at 130°–160° C. and under oxygen partial pressure of 75–200 psi to solubilize at least 90% of the cobalt content, while simultaneously limiting the oxidation of pyrite and precipitating most of the soluble iron and arsenic as jarosite and ferric arsenate;
 (b) discharging the leach slurry from the autoclave and neutralizing the slurry to pH 1.0–1.5 at 85°–95° C. and atmospheric pressure with lime, limestone or other neutralizing agents, so as to continue iron and arsenic precipitation as jarosite and ferric arsenate;
 (c) conducting a liquid-solid separation with the slurry from the atmospheric jarosite precipitation step to obtain a primary filtrate for further processing for cobalt recovery;
 (d) washing the jarosite-ferric arsenate residue to recover entrained metal values, and recirculating the wash solution to the autoclave to form a 25–40% solids slurry with the sodium chloride or sodium sulphate addition to the autoclave.

9. A process as defined in claim 8, wherein the leaching temperature is maintained at about 150° C.

10. A process as defined in claim 8, wherein the oxygen partial pressure is about 175 psi.

11. A hydrometallurgical process defined in claim 8, 9 or 10 wherein pressure leaching is conducted with sodium sulphate within the range of 20–75 g/L.

12. A hydrometallurgical process as defined in claim 8, wherein said cobaltite-pyrite concentrates contain about 5–7%, Co, 0.1–0.4% Ni, 0.3–0.7% Cu, 9–13% As, 26–35% Fe and 28–39% S.

* * * * *